Inventors
Lorin W. Schoepp
Forrest S. McMann

Nov. 10, 1931.   L. W. SCHOEPP ET AL   1,830,858
AUTOMATIC ADJUSTING MECHANISM FOR AIRCRAFT PROPELLERS
Original Filed Oct. 7, 1929   3 Sheets-Sheet 2
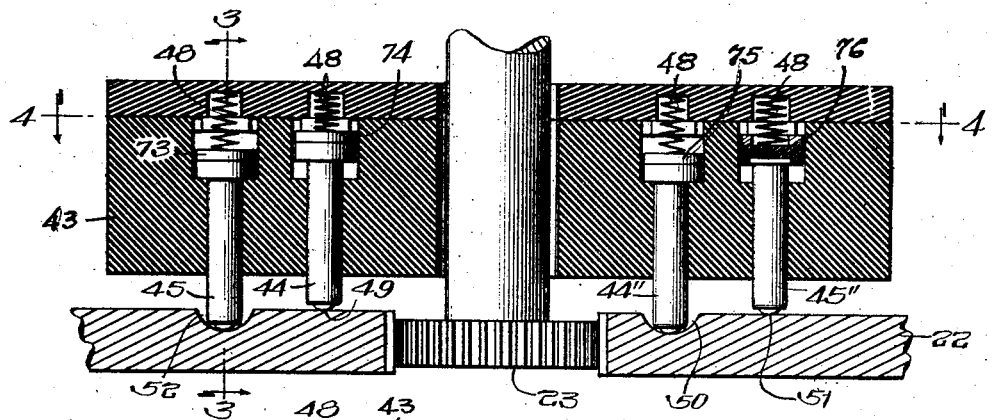
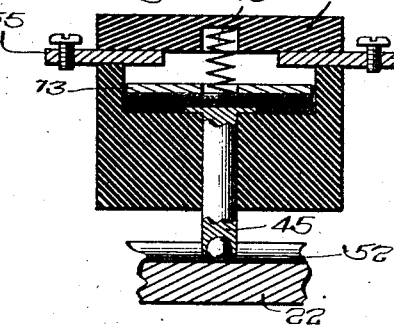
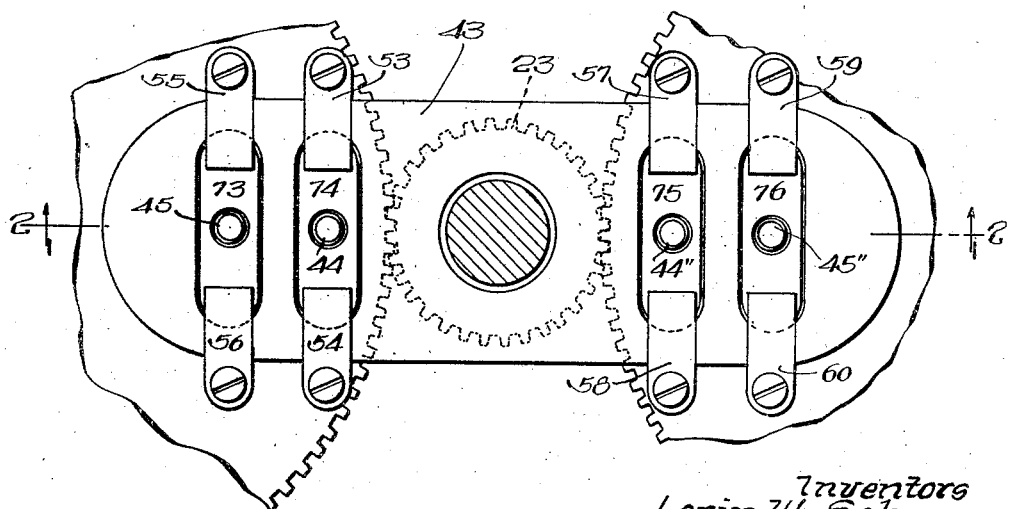
Inventors
Lorin W. Schoepp
Forrest S. McMann
By Samuel W. Banning
Atty.

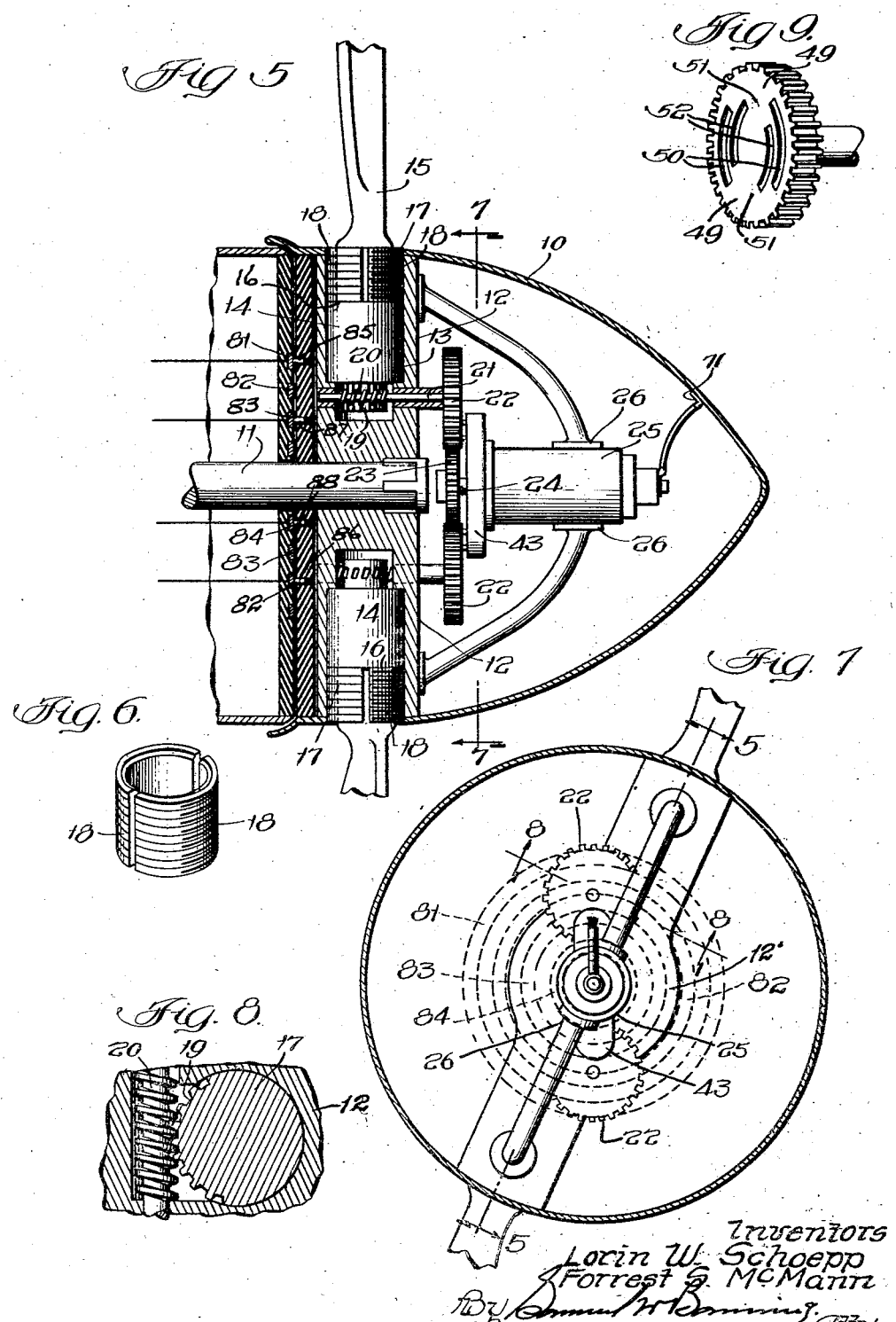

Patented Nov. 10, 1931

1,830,858

UNITED STATES PATENT OFFICE

LORIN W. SCHOEPP AND FORREST S. McMANN, OF CHICAGO, ILLINOIS

AUTOMATIC ADJUSTING MECHANISM FOR AIRCRAFT PROPELLERS

Continuation of application Serial No. 398,083, filed October 7, 1929. This application filed April 9, 1930. Serial No. 442,775.

This invention relates to improvements in automatic adjusting mechanism for aircraft propellers.

Disregarding certain other factors which enter into the construction of aircraft propellers, the thrust or displacement of air by the propeller is dependent upon the angle of attack of the propeller blades. Furthermore, in flying at various altitudes, the air density becomes variable, and therefore an angle of attack which will prove efficient at one altitude may prove inefficient at another, due to variations in the barometric pressures encountered.

Disregarding slight variations due to local causes, the density of the air will diminish with increasing altitude, so that at high elevations, due to a rarefied atmosphere, the propeller blades will fail to produce sufficient thrust, when the blade angle of attack remains unaltered, with the result that the capacity for transmission of power available is reduced or entirely destroyed.

The object of the present invention is to provide automatic adjusting means adapted to vary the angle of attack of the propeller blades in conformity with the variations in the barometric pressure of the atmosphere, so that the propeller blades will thus be automatically adjusted either in ascending or descending pressure gradients, to present the blades at the angle of attack required to produce the most efficient thrust at the air density encountered.

With this end in view, the mechanism consists essentially in the combination of means for rotating the propeller blades at their roots to vary the angle of attack in conjunction with barometrically controlled electrical devices for actuating the blade adjusting mechanism in conformity with variations in the barometric pressures encountered.

The mechanism as a whole is so arranged that it is entirely automatic, being independent of the supervision of the pilot, so that at all times the propeller will operate under conditions of highest efficiency.

Further objects and details of the invention will appear from the description thereof, in conjunction with the accompanying drawings, wherein,—

Fig. 2 is a view in section, showing the proximate relation of the switch-block to the actuating gear wheels;

Fig. 3 is a cross section of one end of the switch-block, taken along the dotted line 3—3 of Fig. 2;

Fig. 4 is a cross sectional view of the switch-block, taken along the line 4—4 of Fig. 2;

Fig. 5 is a view partly in section, along line 5—5 of Fig. 7, showing the mountings of the propeller blades and the means for imparting adjustments to the same;

Fig. 6 is a detail of the split collar associated with the journal mountings for one of the blades;

Fig. 7 is a front view of the blade mountings along the line 7—7 of Fig. 5;

Fig. 8 is a detail view of the worm in mesh with the mutilated worm gear on the root of one of the propeller blades; and Fig. 9 is a perspective view of one of the gears.

Figure 1:
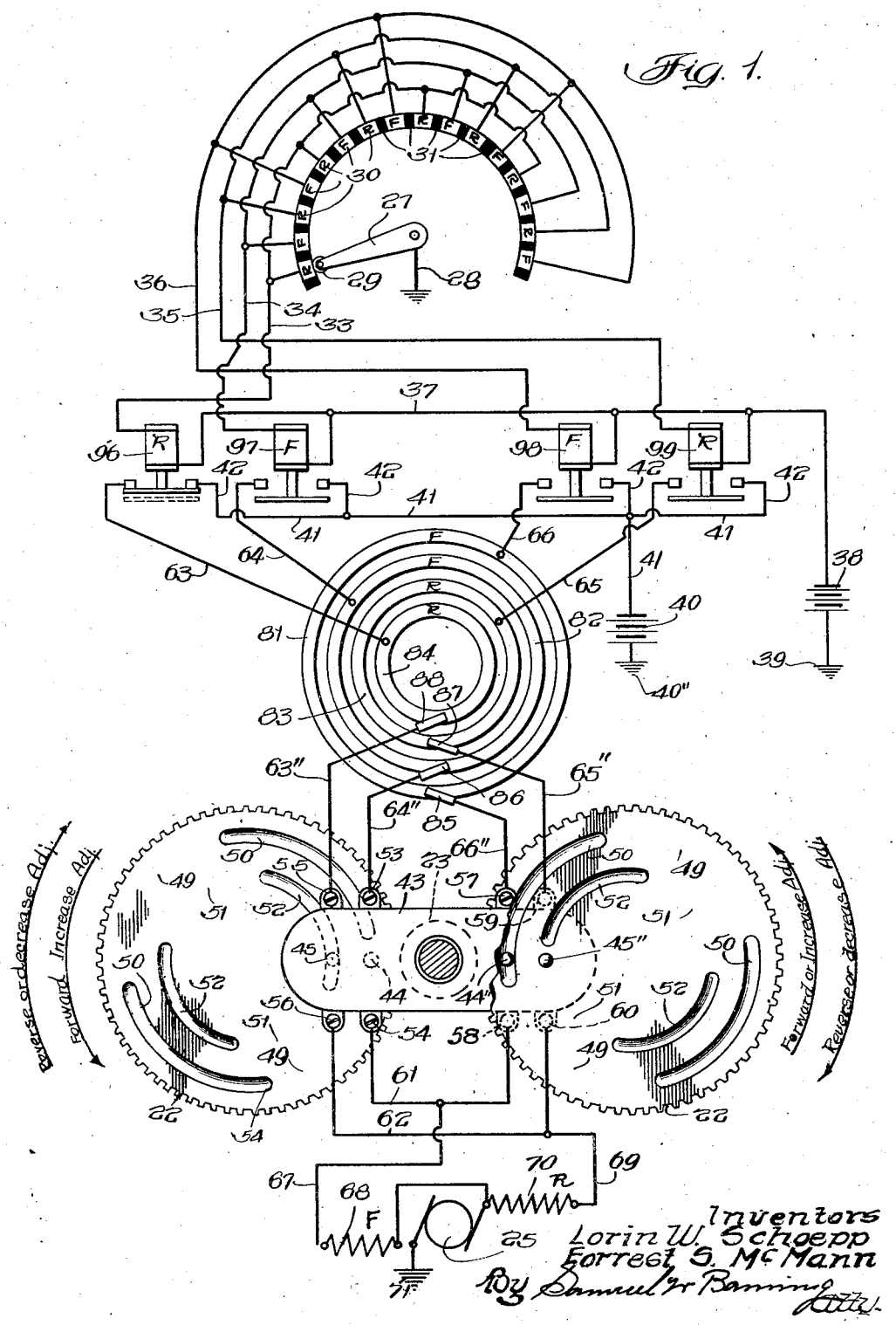
Figure 1 is a diagrammatic view showing the electrical circuits under barometric control for operating the blade adjusting mechanism.

The propeller as a whole comprises a spinner 10, tapered or streamlined at its nose, which spinner and all of the parts now to be described are mounted upon and revoluble with the propeller shaft 11.

Within the spinner is a journal block 12 rigid with the shaft 11, which is provided with oppositely extending journal bores 13, each of which serves to journal the elongated cylindrical root 14, of a propeller blade 15.

The root of the blade is shouldered within the journal bore at the point 16, and at this point the blade root is configured to afford a reduced neck 17, which is surrounded by the two halves of a divided nut or collar 18, which is threaded into the end of the journal bore and bears against the shoulder 16, thereby serving to snugly hold the propeller blade in place and at the same time permit of adjustment to compensate for wear or other causes. This mounting permits the propeller blades to rotate on their axes, in order to permit of the adjustment of the angle of attack in conformity with the principles of the present invention.

Although the drawings illustrate a two-blade propeller, the invention is applicable to a propeller having two or more blades, without substantial modification.

Each of the blades, at its root, is provided with a limited number of worm teeth 19, which mesh with a worm 20. The worm teeth extend but for a limited distance (Fig. 8) and the arrangement thus serves to limit the arc through which the blades may be adjusted, which in most cases will not exceed 15 degrees, since a relatively small variation in the angle of attack of the blades will compensate for substantial variation in barometric pressure.

Each of the worms 20 is mounted upon a worm shaft 21, which extends transversely through the journal block 12 in tangential relation to the worm teeth on the root of the blade, and each worm shaft at its forward end carries a gear 22, preferably of spur form, which gears mesh with a centrally disposed driving pinion 23 mounted upon the motor shaft 24 of a small electric motor 25 carried within a frame 26, which is rigid with the journal block 12.

The motor is provided with what may be termed forward and reverse windings, so that when energized it will impart rotation in a forward or reverse direction, as the case may be, to the driving pinion 23, thereby rotating the respective gears 22 in the same direction, so that limited rotary movements of adjustment will be imparted to the respective propeller blades commensurate with the extent of movement imparted by the motor in one direction or the other.

The method of energizing the motor in response to variations in barometric pressure will now be described.

Figure 1 represents diagrammatically the arrangement of the circuits, which are energized by the movements of a barometer needle 27, which is responsive to variations in atmospheric pressures encountered. It is not deemed necessary to describe the construction of the barometer, which may be of any suitable type employing a needle indicator.

The needle, at its inner end, is grounded through a wire 28, and at its outer end carries a roller 29, which rides over a series of so termed forward and reverse contacts 30, arranged in arcuate formation and separated by spacers 31 of insulating material.

In the drawings, what may be termed the forward contacts are lettered F, and the reverse contacts are lettered R, and, as indicated, the arrangement provides for eight forward adjustments and an equal number of reverse adjustments, although obviously the number may be increased or diminished without departing from the spirit of the invention.

In association with the arcuate group of contacts are four relays, 96, 97, 98, 99. The relays 96 and 99 serve to close circuits leading to the so termed reverse winding 70 of the motor 25, while relays 97 and 98 serve to close circuits leading to the forward winding 68 of the motor 25.

The contacts 30 are variously connected with what may be termed header wires, 33, 34, 35, 36, in the following manner:

The first, third, fifth and seventh reverse contact blocks of the arcuate series are connected with the header wire 33, while the second, fourth, sixth and eighth reverse contact blocks are connected with the header wire 35.

Similarly, the first, third, fifth and seventh forward contact blocks are connected with the header wire 34, while the second, fourth, sixth and eighth forward contact blocks are connected with the header wire 36.

The first reverse header wire 33 connects with the relay 96, while the reverse header wire 35 connects with the relay 99.

Similarly, the first forward header wire 34 connects with the forward relay 97, while the forward header wire 36 connects with the forward relay 98.

All of the relays are energized through a relay wire 37 connected with a battery 38 and grounded at the point 39. The relays are adapted to close a series of circuits which are energized from a battery 40 grounded at 40″, from which leads a universal header wire 41 having lead wires 42 co-operating with the respective relays.

In order that the barometric switch and the battery 40 and relays 96, 97, 98 and 99 may be carried in some part of the aircraft other than the spinner, brushes 85, 86, 87 and 88 are provided on the back of the spinner 10, contacting with so called slip rings 81, 82, 83 and 84 respectively, which are suitably located. In this manner, the motor 25, being revoluble with the propeller hub, may be energized.

A main switch block 43 is provided, which is shown in section in Figs. 2 and 4. This is comprised of a block of insulating material which is suitably secured to the motor 25 in proximate relation to the gears 22. Each of these gears is provided on its face with a plurality of elevations 49 and 51 (Fig. 9) separated by depressions 50 and 52. the elevations 49 and 51 being the normal face of the gears 22, while the depressions 50 and 52 are grooves of suitable depth cut into the face of the gears 22.

In the drawings, four of such elevations 49 and 51, and four depressions 50 and 52, are shown on each gear wheel 22. These elevations and depressions are shown in equally spaced relation to one another as arcs of two concentric circles. Obviously, the number of elevations and depressions may be increased or decreased in the same relation without departing from the spirit of the invention.

The switch-block 43 is provided at one end with two push rods 44 and 45 (Fig. 2) extending transversely from their respective points of contact with the elevations or depressions on the face of one of the gear wheels 22 to where each is joined to its associated bridge bar, 74 and 73 respectively; and similarly at its other end with two push rods 44'' and 45'' joined to their associated bridge bars, 75 and 76 respectively. Each push rod, at its point of contact with the gear wheels 22, carries a ball or some other form of roller to reduce friction. Each of these balls or rollers and its associated push rod will hereinafter be referred to as ball rod 44, ball rod 45, ball rod 44'', and ball rod 45'', respectively, to simplify explanation.

Each bridge bar 73, 74, 75 and 76 is backed by a spring 48, the arrangement being such that when one of the elevations 49 or 51 encounters the associated ball rod 44, 45, 44'' or 45'', it will raise the ball rod and thereby raise its associated bridge bar against spring pressure, the action being similar to that of a poppet valve of a gasolene motor, with the elevations 51 and 49, and the depressions 52 and 50, acting as cams.

Each bridge bar on its upper side is faced with copper or other conducting material, so that when raised by its associated ball rod, it will co-operate with spaced, fixed contact conducting plates, thus serving as a closed switch.

The cross contact 74 (Figs. 1, 2 and 4), when raised by the ball rod 44, co-operates with spaced, fixed contact conducting plates 53 and 54.

Similarly, the cross contact 73 co-operates with plates 55 and 56 when raised by the ball rod 45.

The cross contact 75 co-operates with the plates 57 and 58 when raised by the ball rod 44''.

The cross contact 76 co-operates with the plates 59 and 60 when raised by the ball rod 45''.

The plates 54 and 58 are connected by a conductor 61 (Fig. 1), which is in turn connected to the forward winding 68 of the motor 25 by a conductor 67.

The plates 56 and 60 are connected by a conductor 62, which is in turn connected to the reverse winding 70 of the motor 25 by a conductor 69. The motor is grounded at the point 71.

The first reverse relay 96 serves in part to close a circuit including the associated lead wire 42 and a wire 63 which leads through a slip ring 84, a brush 88, and a wire 63'' to the contact plate 55.

The forward relay 97 serves in part to close a circuit including the lead wire 42 and a wire 64 through a slip ring 82, a brush 86, and a wire 64'', to the contact plate 53.

The second forward relay 98 serves in part to close a circuit which includes a lead wire 42 and a wire 66, slip ring 81, brush 85, wire 66'', leading to the contact plate 57; and the second reverse relay 99 serves in part to close a circuit including the lead wire 42 and a wire 65, slip ring 83, brush 87, wire 65'', leading to the contact plate 59.

The operation of the barometric control will now be described in detail.

We may assume that the aircraft is ascending so that the propeller blades will require an increasing angle of attack adjustment. It will be borne in mind that the so termed forward direction is for an increased angle of attack adjustment, while the so termed reverse direction is for a decreased angle of attack adjustment. The gear wheels 22 are movable in the directions indicated by the arrows in Figure 1.

With the roller 29 in engagement with the first reverse contact 30 of the arcuate series, and with the ball rod 44 raised upon the elevation 49 (Fig. 2), and with the ball rod 45 in the depression 52, and with the ball rod 44'' in the depression 50, and the ball rod 45'' raised upon the elevation 51, the switch formed by contacts 53, 54 and 74 is closed (refer to Figs. 1 and 4).

The switch formed by contacts 55, 56 and 73 is open.

The switch formed by contacts 57, 58 and 75 is open.

The switch formed by contacts 59, 60 and 76 is closed.

The first reverse relay 96 will be energized and close the relay switch between the wires 42 and 63, but this will be ineffective, for the reason that the switch connections 55, 56 and 73 between the wire 63'' and the reverse winding of the motor 25 will be open as stated above, so that no energizing of the motor will occur.

As the aircraft ascends, the barometer needle will advance to bring the roller 29 into engagement with the first forward contact 30, which will energize the forward relay 97 and close the circuit gap between the wire 42 and the wire 64, the slip ring 82, brush 86, and wire 64'', and with the switch formed by contacts 53, 54 and 74 closed, as stated above, a current will flow through the contacts 53, 54 and 74 and the wire 67 to the forward winding 68 of the motor 25, thereby energizing the forward winding and causing the motor to turn the gears 22 in the forward or counter clockwise direction, as indicated by the arrows. This imparts an increased angle of attack adjustment through the gearing, which will continue momentarily and until the ball rod 44 has been released from the first elevation 49 and drops into the next adjacent depression 50. This will break the connections through the contacts 53, 54 and 74 and stop the motor and at the same time close the switch formed by the contacts 57, 58 and 75.

From the drawings it will be seen that the other two switches will also simultaneously alternate their positions, i. e., the switch, 55, 56 and 73, is now closed, while the switch, 59, 60 and 76, is open.

A continuing elevation will bring the roller 29 into engagement with the second reverse contact, thereby energizing the reverse relay 99, but the current cannot flow through the wire 65, since the switch, 59, 60 and 76, is now open, so that no adjustment will occur.

A continuing elevation brings the roller 29 into engagement with the second forward contact 30, and thus energizes the forward relay 98. With the contacts 57, 58 and 75 closed, as stated above, a current will flow through the wire 66, slip ring 81, brushes 85, wire 66'', contacts 57, 58 and 75, connecting wire 61 and wire 67 to the forward winding 68 of the motor, so that the second forward adjustment of the propeller blades will momentarily occur until the ball rod 44'' drops into the next adjacent depression 50, thus opening the swicth, 57, 58 and 75, and stopping the motor 25. The switch, 55, 56, and 73, is also now open, while switches 53, 54 and 74, and 59, 60 and 76 are now closed.

Continuing adjustments of like character will occur from time to time within the range of adjustment provided, and while the aircraft is ascending, the engagements of the roller 29 with the reverse contacts of the arcuate series will in each instance be ineffective by reason of the mutual co-operation of the elevations 49 and 51 and the depressions 50 and 52 with the contact mechanisms at the opposite ends of the main switch block 43.

When the aircraft begins to descend, a reverse adjustment will of course be necessary. If the descent begins from the elevation represented by engagement of the roller 29 with the second forward contact, the first so termed reverse adjustment will be initiated by the recession of the roller 29 to the second reverse contact, which energizes the reverse relay 99 and establishes a circuit through the wire 65, slip ring 83, brush 87, wire 65'', contacts 59, 60 and 76, wires 62 and 69, to the reverse winding 70 of the motor 25, so that a reverse adjustment will momentarily occur by turning the gears 22 in a clockwise direction, as indicated by arrows, until the ball rod 45'' drops into the next adjacent depression 52, thus opening the switch 59, 60 and 76, and stopping the motor 25. The switch 53, 54 and 74 is now open, while switches 55, 56 and 73, and 57, 58 and 75 are now closed.

Continued descent brings the roller 29 into engagement with the first forward contact of the arcuate series, which energizes the forward relay 97, but no current can flow through the wire 64 at this moment, since the switch contacts 53, 54 and 74 are open, as stated above.

Continued recession of the roller 29 brings it into contact with the first reverse contact of the arcuate series, which energizes the reverse relay 96 and establishes a circuit through the wire 63, slip rings 84, brush 88, wire 63'', contacts 55, 56 and 73, to the wires 62 and 69 leading to the reverse winding 70 of the motor 25, thus imparting an adjustment to the gears 22 in a clockwise direction until the ball rod 45 drops into the next adjacent depression 52, opening the switch 55, 56 and 73, and stopping the motor 25. In this position the switch, 57, 58 and 75, will also be open. Switches 53, 54 and 74, and 59, 60 and 76 will be closed. The adjusting mechanism is now back to the original starting position.

From the above description, it will be seen that progressive adjustments of the propeller blades, either in the direction of increased or decreased angle of attack, will be secured by a coordination of the main switches with the alternate elevations and depressions on the face of the gears 22 which rotate in conformity with adjustments of the propeller blades.

Although, in ascending, the barometer needle must of necessity alternately energize the forward and reverse relays, nevertheless, the energizing of the reverse relays during ascent will be ineffective to energize the motor, so that the motor circuit will be completely closed only through the forward windings, and this will continue by progressive stages until the aircraft begins to descend, during which period the reverse winding only will be energized, so that all of the progressive adjustments will be in the reverse direction throughout the descent.

The method of barometric adjustment is one which may be employed in connection with mechanical means of varying description for imparting the motor movements to the blades, so that it will be understood that it is not the intention, unless otherwise indicated in the claims, to limit the invention to blade adjusting mechanisms of the precise character indicated, since the invention resides primarily in the barometric control of motor elements adequate to impart forward or reverse adjusting movements in a degree commensurate with variations in barometric pressure as registered by the needle or other movable portion of the barometer which is responsive to variations in pressure.

We claim:

1. In mechanism of the class described, the combination of propeller blades, mechanism for imparting movements of adjustment to vary the angle of attack of the propeller blades, a device provided with a movable element responsive to variations in air pressure, and means actuated by said movable element for imparting adjusting movements, in commensurate degree, to the blade adjusting mechanism, the blade adjusting mechanism including an electric motor operable in one direction while the pressure responsive means is subject to diminishing pressures, and in the opposite direction while the pressure responsive means is subject to increasing pressures.

2. In mechanism of the class described, the combination of a propeller provided with axially adjustable propeller blades, a motor and transmission connections for imparting increased or decreased angle of attack adjustments to the propeller blades, pressure responsive means including an element movable through varying degrees commensurate with pressure variations, and electrical circuit mechanisms operable by the movements of said pressure movable element for energizing the motor to initiate blade adjusting movements commensurate in degree and direction with the movements of the pressure controlled movable element.

3. In mechanism of the class described, the combination of a propeller provided with axially adjustable propeller blades, a motor and transmission connections for imparting increased or decreased angle of attack adjusting movements to the propeller blades, pressure responsive means including an element movable through varying degrees commensurate with pressure variations, and electrical circuit mechanisms operable by the movements of said pressure movable element for energizing the motor to initiate blade adjusting movements commensurate in degree and direction with the movements of the pressure controlled movable element, said electrical circuit mechanisms including relay circuits and motor circuits energized by the respective relay circuits.

4. In mechanism of the class described, the combination of a propeller provided with axially adjustable propeller blades, a motor and transmission connections for imparting increased or decreased angle of attack adjusting movements to the propeller blades, pressure responsive means including an element movable through varying degrees commensurate with pressure variations, and electrical circuit mechanisms operable by the movements of said pressure movable element for energizing the motor to initiate blade adjusting movements commensurate in degree and direction with the movements of the pressure controlled movable element, said electrical circuits including so termed forward and reverse relay circuits adapted to be alternately energized by continued movements of the pressure actuated movable element, and so termed forward and reverse motor circuits adapted to be energized through the energizing of the associated relay circuits in conformity with increase and decrease of pressures.

5. In mechanism of the class described, the combination of a propeller provided with axially adjustable propeller blades, a motor and transmission connections for imparting increased or decreased angle of attack adjusting movements to the propeller blades, pressure responsive means including an element movable through varying degrees commensurate with pressure variations, and electrical circuit mechanisms operable by the movements of said pressure movable element for energizing the motor to initiate blade adjusting movements commensurate in degree and direction with the movements of the pressure controlled movable element, said electrical circuits including so termed forward and reverse relay circuits adapted to be alternately energized by continued movements of the pressure actuated movable element, and so termed forward and reverse motor circuits adapted to be energized through the energizing of the associated relay circuits in conformity with increase and decrease of pressures, the opening and closing of the respective motor circuits being effected by means of movable connections associated and movable with the propeller blades, in a degree commensurate with the adjustments imparted thereto.

6. In mechanism of the class described, the combination of a propeller provided with axially adjustable propeller blades, a motor and transmission connections for imparting increased or decreased angle of attack adjusting movements to the propeller blades, pressure responsive means including an element movable through varying degrees commensurate with pressure variations, and electrical circuit mechanisms operable by the movements of said pressure movable element for energizing the motor to initiate blade adjusting movements commensurate in degree and direction with the movements of the pressure controlled movable element, said circuit mechanisms including alternating forward and reverse contacts adapted to be successively engaged by the pressure responsive movable element, relay circuits connected with said forward and reverse contacts, motor circuits associated with the respective relay circuits and adapted to be in part controlled thereby, and a main switch actuable by the adjusting movements imparted to the propeller blades for opening and closing the respective motor circuits.

7. In mechanism of the class described, the combination of propeller blades mounted for axial adjustment, a motor and connections for imparting increased or decreased angle of attack adjusting movements to the propeller blades, said motor having forward and reverse windings, a plurality of motor circuits for respectively energizing the forward and reverse windings, a main switch associated with all of the motor circuits, means in train with the blade adjusting mechanism for actuating the main switch in conformity with the adjusting movements of the propeller blades, a movable device responsive to variations in air pressure, and means associated with said pressure responsive movable device for in part progressively closing the motor circuits, subject to the control thereof by the main switch to impart forward and reverse movements to the motor commensurate in degree and direction with the movements of the pressure responsive movable element.

8. In mechanism of the class described, the combination of a propeller having axially adjustable blades, a motor and transmission trains for imparting increased or decreased angle of attack adjusting movements to the blades, said motor having forward and reverse windings, a plurality of motor circuits, a main switch for in part controlling the energizing of the respective motor circuits, said main switch having a plurality of groups of contact devices, each group of contact devices being operable by mechanism associated and movable with the blade adjusting mechanism, and the contact groups being actuated in alternation with one another, movable means responsive to variations in air pressure, and so termed forward and reverse relays for in part controlling the closing of the respective motor circuits and adapted to be actuated in alternate succession by the progressive movement of the pressure responsive movable element, the parts being arranged to energize the motor in the forward or increased angle of attack direction when a forward relay is closed, and the main switch adjusted to complete the closing of a forward motor circuit and to impart a reverse or decreased angle of attack adjustment when a reverse relay is closed, and the main switch adjusted to complete the closing of the reverse circuit.

In witness that we claim the foregoing, we have hereunto subscribed our names this 18 day of March, 1930.

LORIN W. SCHOEPP.
FORREST S. McMANN.